(12) United States Patent
Jensen et al.

(10) Patent No.: US 6,425,726 B1
(45) Date of Patent: Jul. 30, 2002

(54) SIDE DUMP BODY INCLUDING A MATERIAL COMPACTION ASSEMBLY

(75) Inventors: Layton W. Jensen, Thurston, NE (US); Ralph R. Rogers, Dakota Dunes, SD (US)

(73) Assignee: Thurston Mfg. Co., Thurston, NE (US)

( * ) Notice: Subject to any disclaimer, the term of this patent is extended or adjusted under 35 U.S.C. 154(b) by 0 days.

(21) Appl. No.: 09/550,101

(22) Filed: Apr. 14, 2000

(51) Int. Cl.[7] ................................................. B60P 1/00
(52) U.S. Cl. .................. 414/525.2; 100/218; 414/525.6
(58) Field of Search ................................. 414/471, 501, 414/492, 719, 525.2, 525.6; 298/17.7, 17.8; 100/218

(56) References Cited

U.S. PATENT DOCUMENTS

| | | | | |
|---|---|---|---|---|
| 4,005,789 A | * | 2/1977 | Gladwyn et al. | ......... 214/82 X |
| 4,113,120 A | * | 9/1978 | Pickrell | ..................... 214/38 X |
| 5,501,567 A | * | 3/1996 | Lanzdorf et al. | ........ 414/408 X |
| 5,560,289 A | * | 10/1996 | Pernsteiner | ............... 100/34 X |

\* cited by examiner

*Primary Examiner*—Christopher P. Ellis
*Assistant Examiner*—Kenneth Bower
(74) *Attorney, Agent, or Firm*—Thomte, Mazour & Niebergall; Dennis L. Thomte

(57) ABSTRACT

A side dump body including a side dump body unit pivotally mounted on a truck or trailer frame. The side dump body unit is pivotally moved from a transport position to a dumping position wherein the contents of the dump body unit may be dumped from the side of a truck or trailer. A material compactor is provided at the upper end of the body unit for compacting material within the body unit. The material compactor may be moved from its operative compaction position wherein it overlies the upper end of the body unit to an inoperative position at one side of the body unit so that the body unit may be moved to its dumping position without interference from the material compactor.

11 Claims, 6 Drawing Sheets

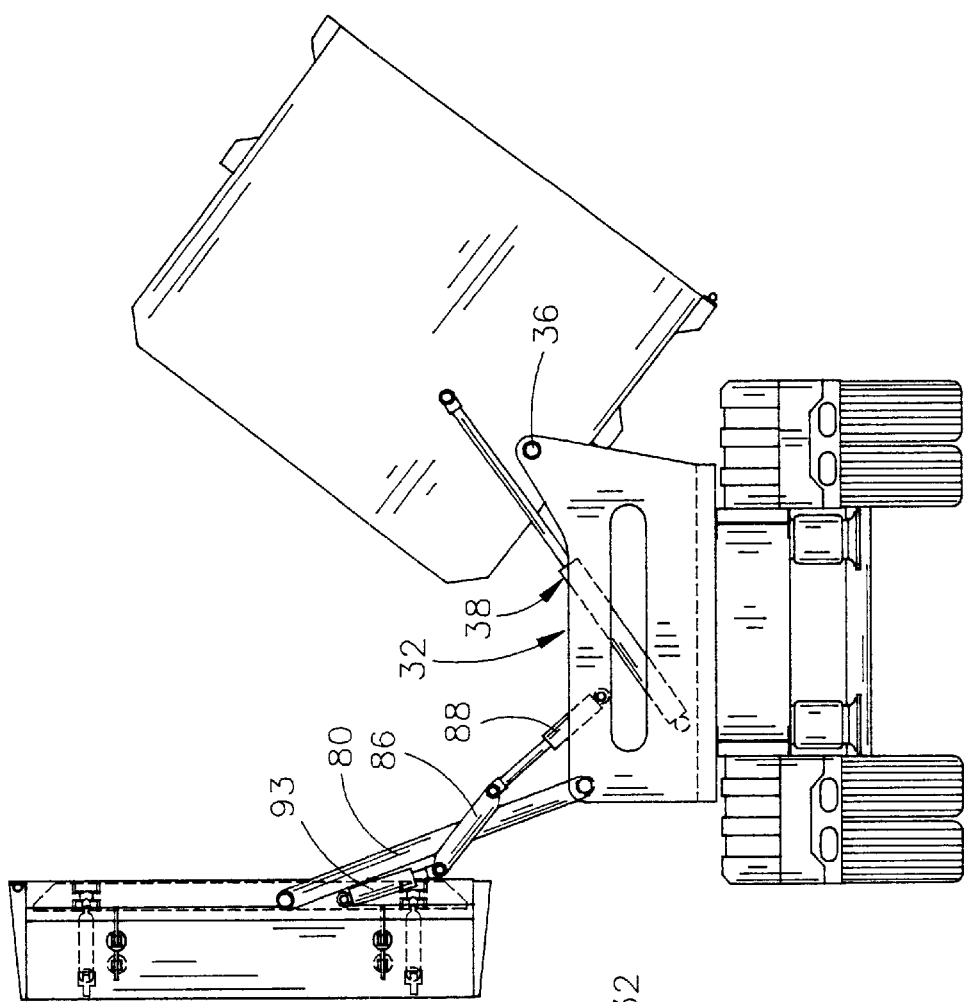
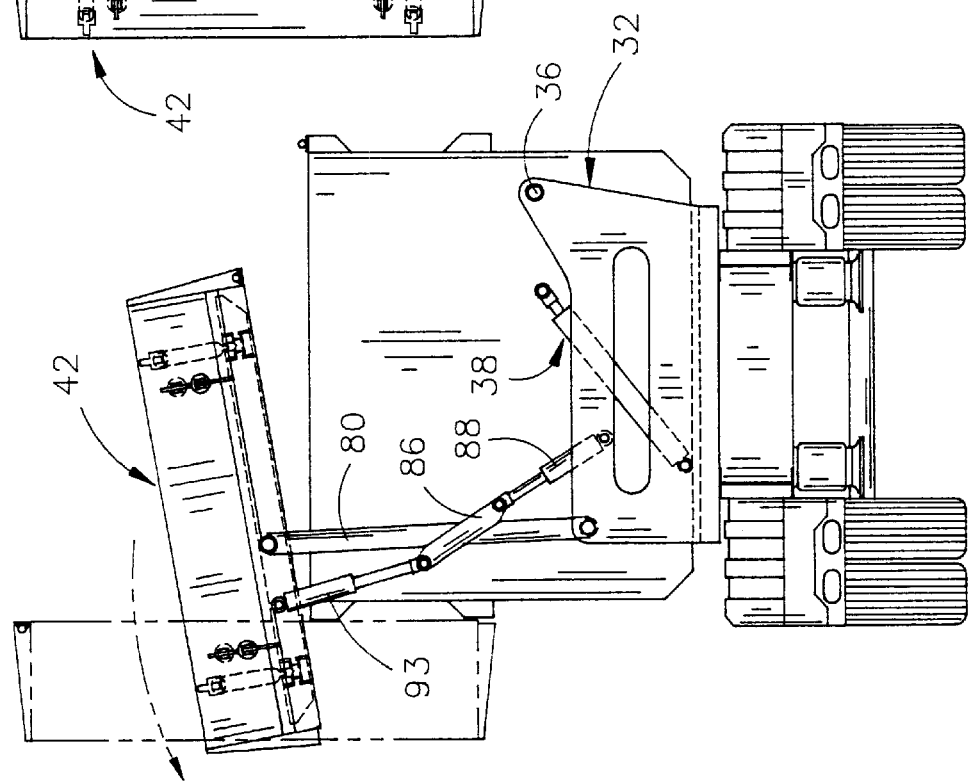

SIDE DUMP BODY INCLUDING A MATERIAL COMPACTION ASSEMBLY

BACKGROUND OF THE INVENTION

1. Field of the Invention

This invention relates to a side dump body and more particularly to a side dump body for use on a trailer or truck. More specifically, the invention relates to a side dump body which has increased carrying capacity when compared to conventional side dump trailers and which has a material compaction assembly associated therewith. The material compaction assembly of this invention may also be used on bottom dump bodies, walking floor bodies or live floor bodies.

2. Description of the Related Art

Dump bodies which are employed on trailers or trucks normally are of the end dump type or the side dump type. Since the introduction of the side dump body disclosed in U.S. Pat. No. 5,480,214, side dump trucks and trailers have experienced wide acceptance. Perhaps the only drawback to the side dump body of U.S. Pat. No. 5,480,214 is that the body does not have as much carrying capacity as an end dump body due to the fact that the side walls of the side dump body extend upwardly and outwardly from a bottom wall, rather than extending vertically upwardly from a bottom wall as in most conventional end dump bodies.

Although the side dump bodies have met with considerable success, the side dump bodies of the prior art are not believed to have any capability of compacting the material within the body or container. If the material compaction assembly is associated with the side dump body, the side dump body has another use, that is, for the collection of refuse or the like.

SUMMARY OF THE INVENTION

A leak-proof side dump body is disclosed which has substantially vertically disposed side walls to increase the carrying capacity of the body as compared to those side dump bodies having upwardly and outwardly extending side walls. A plurality of horizontally spaced-apart supports are secured to the frame means of the truck or trailer. A side dump body is positioned between each pair of the supports and is pivotally secured thereto so that the dump body may be moved from a transport position to a dumping position.

A material compaction assembly is movably supported on the frame of the truck or trailer and is movable from a compaction position over the upper end of the dump body to an inoperative position at one side of the dump body. When the material compaction assembly is in its inoperative position, the side dump body may be pivotally moved to its dumping position without interference from the material compaction assembly. The material compaction assembly comprises a hood or housing having a support frame provided in the interior thereof. A material compaction member is movably supported on the support frame in the hood of the material compaction assembly and is movable from a position within the hood downwardly into the side dump body to compact the material therein.

The inoperative position of the material compaction assembly also provides a counterbalance during the dump cycle.

It is therefore a principal object of the invention to provide an improved side dump body for use on a truck or trailer which has a material compaction assembly mounted thereon.

Still another object of the invention is to provide a side dump body having an increased carrying capacity when compared to conventional side dump bodies and which has a material compaction assembly mounted thereon.

Still another object of the invention is to provide a material compaction assembly for a side dump body which may be moved from an operative position at the upper end of the body to an inoperative position adjacent the body so that the body may be pivotally moved to its dumping position without interference from the material compaction assembly.

Still another object of the invention is to provide a side dump trailer or truck wherein a plurality of side dump bodies having material compaction assemblies mounted thereon are individually selectively pivotally secured to the frame means of the truck or trailer.

Yet another object of the invention is to provide a material compaction assembly for a side dump body wherein the compaction assembly provides a counterbalance, when in its inoperative position, during the dump cycle.

Yet another object of the invention is to provide a material compaction assembly for a side dump body which secures the load during transport.

Yet another object of the invention is to provide a material compaction assembly for a side dump body which is leak-proof.

These and other objects will be apparent to those skilled in the art.

BRIEF DESCRIPTION OF THE DRAWINGS

FIG. 8 is a rear elevational view illustrating the compaction assembly in its inoperative position; and FIG. 9 is a view similar to FIG. 8 except that the side dump body has been moved to its dumped position.

DESCRIPTION OF THE PREFERRED EMBODIMENT

Figure 1:
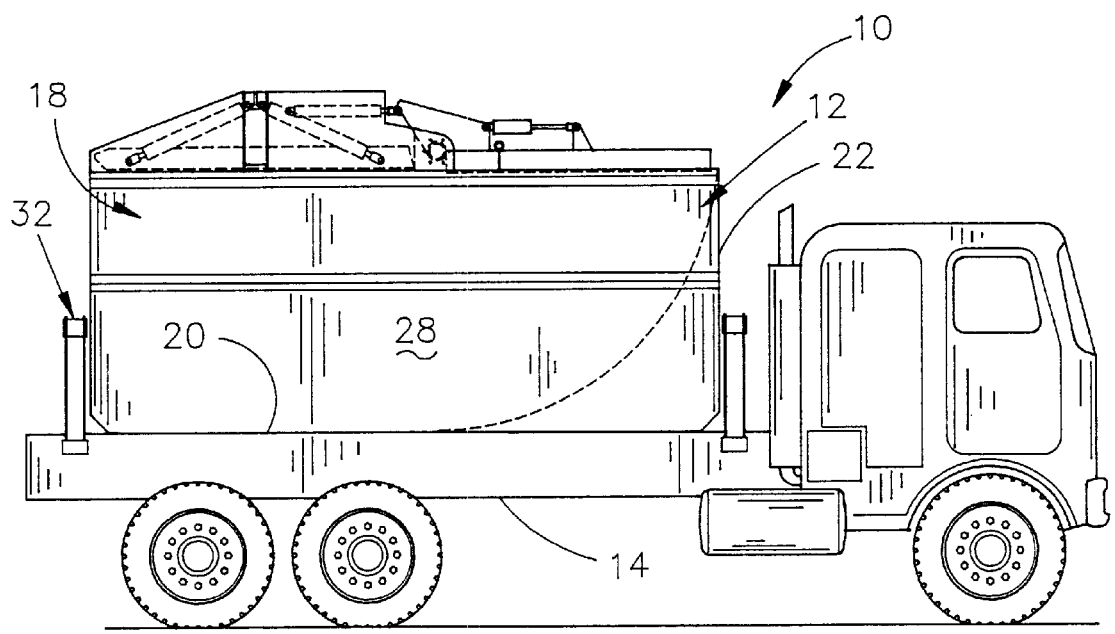
FIG. 1 is a side elevational view of this invention.
Figure 2:
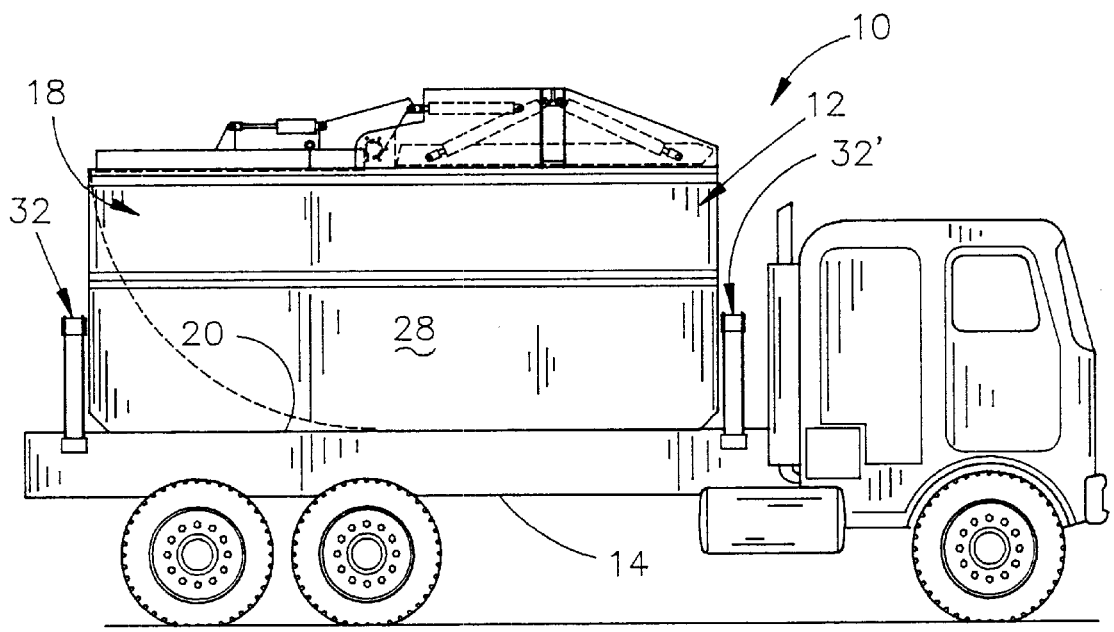
FIG. 2 is a side elevational view of this invention but illustrates the body having been reversed from that of FIG. 1.

The side dump body apparatus of this invention is referred to generally by the reference numeral 10 and comprises one or more side dump units 12 mounted on a frame means 14 which may be incorporated into a trailer or into what is commonly called a straight truck. Although the drawings illustrate the side dump body 10 being mounted on a straight truck 16, the side dump body could also be mounted on a trailer as described.

Although the drawings illustrate a single side dump unit 12 being mounted on the truck 16, a plurality of side dump units 12 may be utilized if desired.

Side dump unit 12 includes a body or tub 18 including a bottom wall 20, front wall 22, back wall 24 and opposite side walls 26 and 28. Front wall 22, back wall 24 and side walls 26 and 28 define an open upper end 30.

Supports 32 and 32' are secured to the frame means of the truck in a spaced-apart relationship and are positioned rearwardly of the back wall 24 of the body 18 and are positioned forwardly of the front wall 22 of the body 18. Inasmuch as each of the supports 32 and 32' are identical, only support 32 will be described in detail. Support 32 is provided with upwardly extending projection 34 at one side thereof which is pivotally secured to the back or front wall by means of pin 36. Hydraulic cylinder 38 is pivotally connected at its base end to the support 32 at 39 and has its rod end pivotally connected to the back or front wall of the body 18 at 40. Thus, extension of the hydraulic cylinders 38 on the supports 32 and 32' will cause the body 18 to be pivotally moved from its transport position to its dumping position and vice versa.

The numeral 42 refers to a material compaction assembly which is operatively pivotally secured to the frame of the trailer and which may be positioned in its operative position, illustrated in FIG. 3, wherein it is positioned over the open upper end of the body 18 to an inoperative position at one side of the body 18, as will be described in more detail hereinafter.

Figure 6:
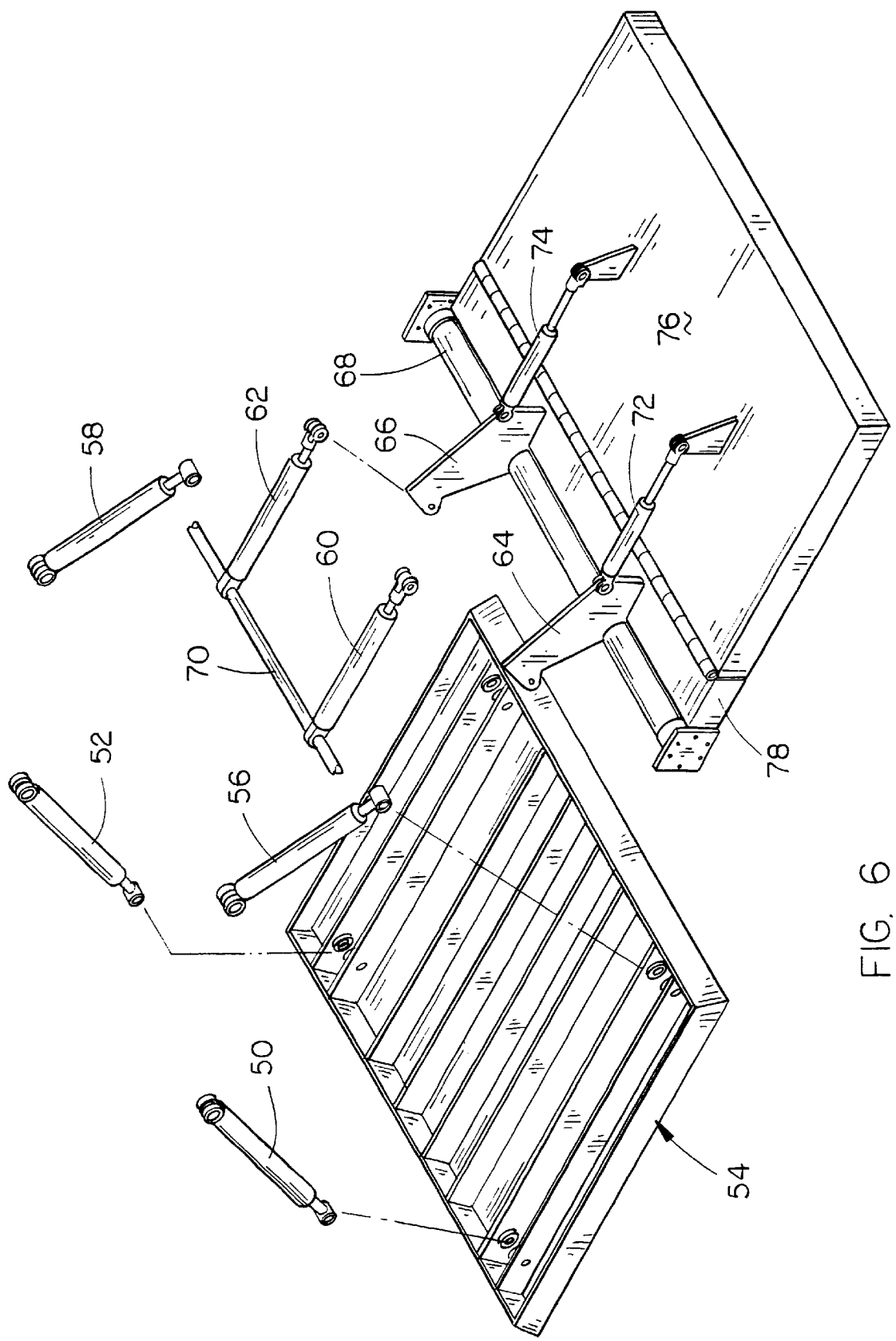
FIG. 6 is an exploded perspective view of the compaction assembly.
Figure 7:
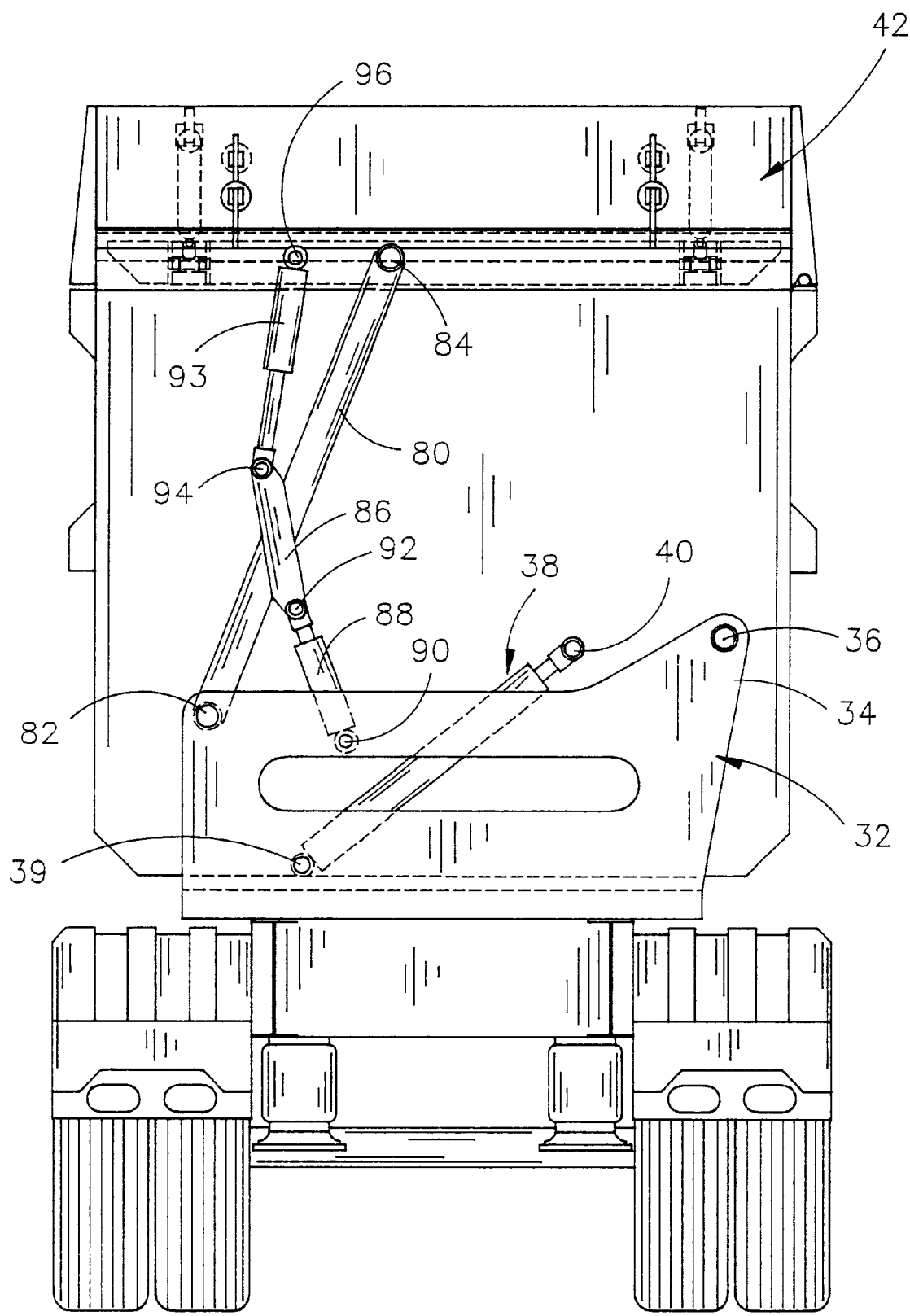
FIG. 7 is a rear elevational view of the invention.

Material compaction assembly 42 includes a hood or housing 44 having a configuration such that it will close the upper end of the body 18 when it is in its operative or compaction position. The material compaction assembly 42 includes hydraulic cylinders 50 and 52 pivotally secured at their base ends to hood 44 and having their lower ends pivotally connected to the rear end of a vertically movable material compaction member 54. A pair of hydraulic cylinders 56 and 58 have their base ends pivotally connected to the hood 44 and have their lower rod ends pivotally connected to the forward end of the material compaction member 54. Hydraulic cylinders 60 and 62 are positioned in the hood 44 and have one end thereof pivotally connected to arms 64 and 66, respectively, which are mounted on a rock shaft 68. The base ends of cylinders 60 and 62 are mounted on a support 70, as seen in FIG. 6. A pair of hydraulic cylinders 72 and 74 are pivotally connected at one end thereof to the arms 64 and 66 and have their rod ends pivotally connected to a compaction member 76 which is pivotally connected to a compaction member 78 which in turn is connected to the arms 64 and 66, as illustrated in FIG. 6.

Figure 3:
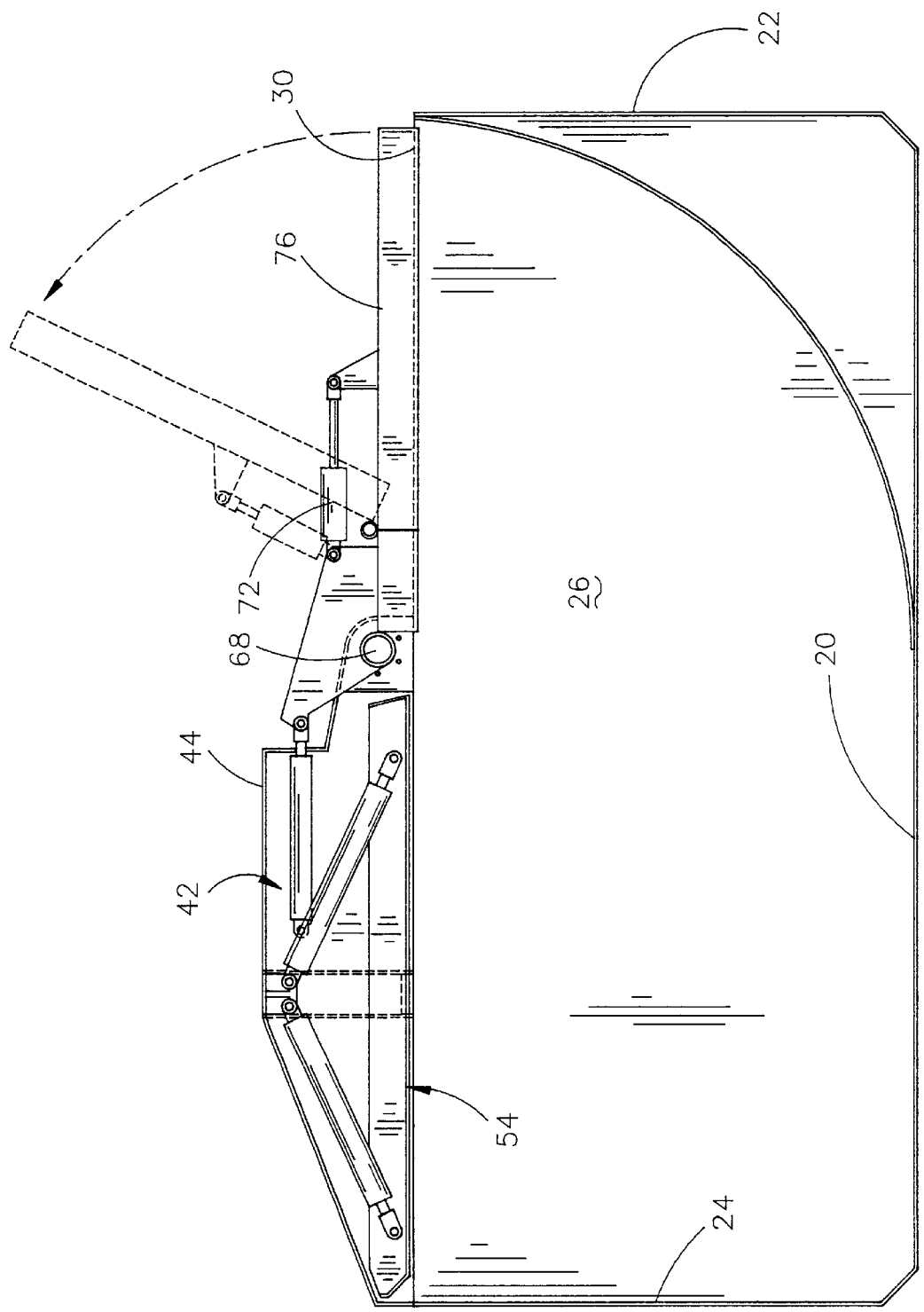
FIG. 3 is a side elevational view of the body of FIG. 1 with the broken lines illustrating the position to which the fill door may be raised.

The hydraulic cylinders 60 and 62 are utilized to pivot the compaction member 76 to the upwardly extending (open) position illustrated by broken lines in FIG. 3 to provide an opening into the interior of the dump body 32 to enable material to be placed within the dump body. The opening created by the compaction member 76 when it is in its upwardly extending position may be located at either the forward or rearward end of the dump body 32.

Figure 5:
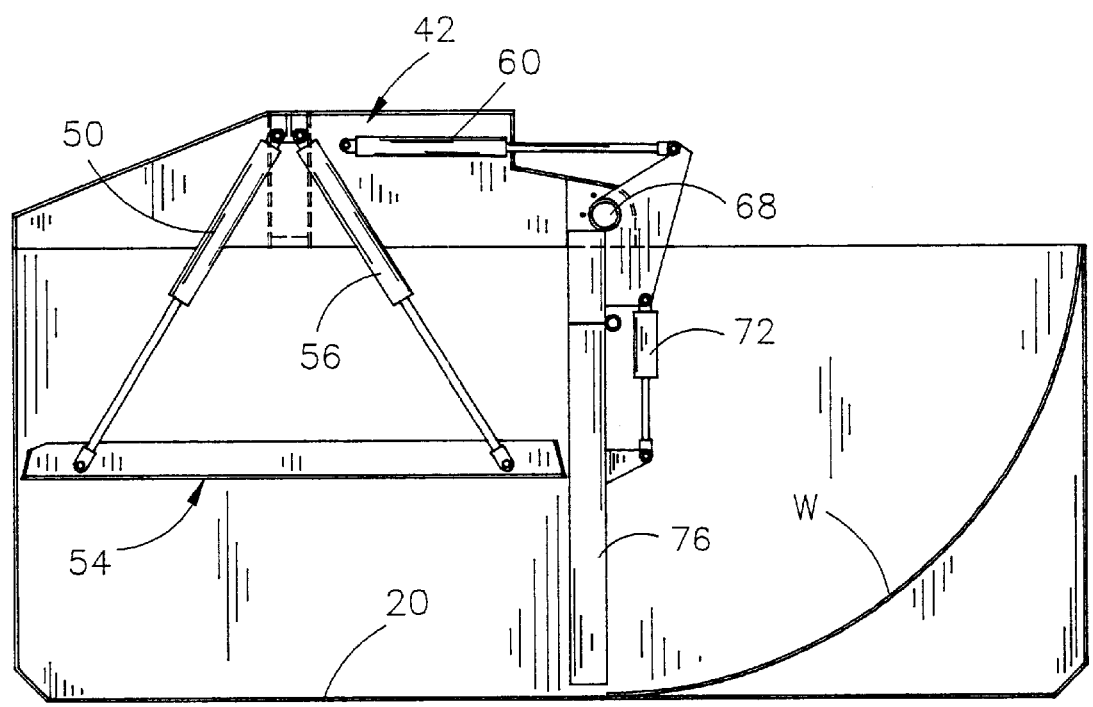
FIG. 5 is a view similar to FIG. 4 except that the drawing illustrates a second compaction member having been moved downwardly into the body.

Assuming that the compaction member 76 is in its upwardly extending open position, indicated by broken lines in FIG. 3, material may be placed into the interior of the dump body 32. When the interior of the dump body 32 is sufficiently full, the hydraulic cylinders 72 and 74 are extended to move compaction member 76 to the position illustrated in FIG. 3. The hydraulic cylinders 60 and 62 are extended to cause the arm 68 to pivot so that compaction members 76 and 78 are pivotally moved from the horizontally disposed position to the substantially vertically disposed position (FIG. 5) which causes the material in the body 32 to be moved downwardly and rearwardly within the dump body. It is preferred that an arcuate wall W be provided in the interior of the dump body 32 to prevent material from accumulating in the lower corners and ends of the body 32.

Figure 4:
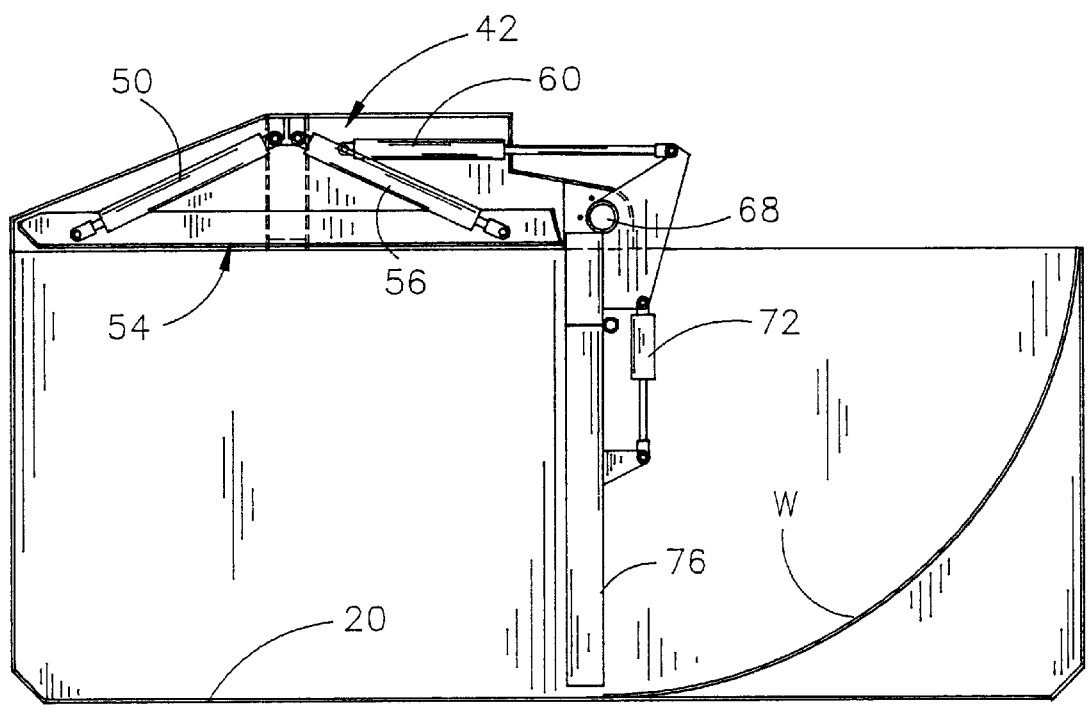
FIG. 4 is a cut-away view illustrating one of the compaction members having been pivoted inwardly.

When the compaction members 76 and 78 have been pivotally moved to the vertically disposed position of FIG. 4, the hydraulic cylinders 50, 52, 56 and 58 are extended, which causes the compaction member 54 to move downwardly within the side dump body 32 to compress the material therein which is positioned rearwardly of the vertically disposed compaction members 76 and 78. When the material in the body has been compacted, the compaction member 54 is moved upwardly to the upper end of the body by retracting the cylinders 50, 52, 56 and 58, and the compaction members 76 and 78 are pivotally moved upwardly to their horizontally disposed position by the retraction of cylinders 60 and 62 with the hydraulic cylinders 72 and 74 then pivotally moving the compaction member 76 to its upwardly extending open position so that additional material may be placed within the dump body. The procedure is continually repeated until the side dump body is fully loaded with compacted material.

Means is provided on each of the supports 32 and 32' for pivotally moving the compaction assembly between its operative and inoperative positions. Inasmuch as the pivot means is identical, only the pivot means on support 32 will be described in detail. An elongated arm 80 has its lower end pivotally secured to the support 32 at 82 and has its upper end pivotally connected to one end of the material compaction assembly 42 at 84. Bar 86 is rigidly fixed to arm 80, as seen in the drawings. Hydraulic cylinder 88 has one end thereof pivotally connected to support 32 at 90 and has its other end pivotally connected to one end of the bar 86 at 92. Hydraulic cylinder 93 has its rod end pivotally connected to one end of the bar 86 at 94 and has its base end pivotally connected to one end of the material compaction assembly 42 at 96.

Assuming that the material compaction assembly 42 is in its horizontally disposed position wherein it overlies the open upper end of the body 18, the material compaction assembly 42 is moved to its inoperative position as follows. Hydraulic cylinder 88 is initially extended somewhat which causes the arm 80 to pivotally move in a counterclockwise direction about pivot point 82 which causes the material compaction assembly 42 to be slightly raised upwardly from the upper end of the body 18. Once the material compaction assembly 42 has cleared the upper end of the body 18, hydraulic cylinder 88 is extended and hydraulic cylinder 93 is retracted which causes the material compaction assembly 42 to move to the substantially vertically disposed inoperative position at one side of the body 18. When the material compaction assembly 42 is in the inoperative position, the hydraulic cylinders 38 on the supports 32 and 32' may be extended so that the body 18 will be pivotally moved from its transport position to the dumping position, as illustrated in FIG. 8. When the material in the body 18 has been dumped laterally of the truck, the hydraulic cylinders 38 are retracted to move the body 18 back to its transport position.

Hydraulic cylinder 88 is then retracted and hydraulic cylinder 93 is then extended to cause the material compaction assembly 42 to be pivotally moved from its vertically disposed inoperative position to its horizontally disposed operative or compaction position.

Although the compaction assembly is ideally suited for use with a side dump body, it could also be used with a bottom dump body, a walking floor body, or a live bottom body. It should be noted that the compaction assembly, when in its inoperative position, acts as a counterbalance during the dump cycle. Another advantage of this invention is that the compaction assembly secures the load in place during transport. Yet another advantage of this invention is that it is leak-proof.

Thus it can be seen that a novel side dump body having a material compaction assembly mounted thereon has been disclosed which accomplishes at least all of its stated objectives.

We claim:

1. In combination:
   a wheeled frame means having a rearward end, a forward end, and first and second sides;
   at least one side dump body movably positioned on said frame means and being pivotally movable from a transport position to a side dumping position;
   means for moving said dump body between its transport position and dumping position;
   said dump body including a front wall, a back wall, a bottom wall, first and second side walls, and an open upper end;
   a material compaction assembly selectively movably positioned on said dump body which extends over said open upper end and which includes a material compaction means which is movable between a retracted position at said open upper end of said dump body downwardly to a compaction position in the interior of said dump body to compact the material therein;
   said material compaction assembly being movable from an operative position wherein it extends over said open upper end to an inoperative position to enable the pivotal movement of said dump body between its said transport and dumping positions without interference from said material compaction assembly;
   said material compaction assembly comprising a frame means having first and second ends positioned over said open upper end; a first frame portion at said first end of said frame means having one end of a first power cylinder means secured thereto with the other end of said first power cylinder means being pivotally connected to a vertically movable first material compaction member which is movable from a retracted position above said open upper end downwardly to a compaction position within said dump body; a second material compaction member pivotally mounted to said frame means, about a horizontal axis, which is pivotally movable from a horizontally disposed position above said open upper end adjacent said first material compaction member to a substantially vertically disposed downwardly extending position within said dump body.

2. The combination of claim 1 wherein a power cylinder means is provided in said material compaction assembly for moving said material compaction member between its said retracted and compaction positions.

3. The combination of claim 1 wherein a third power means is operatively secured to said second material compaction member for pivotally moving said second material compaction member to an upwardly extending position to enable material to be placed within said dump body between said second material compaction member and said open upper end of said dump body.

4. The combination of claim 1 wherein said material compaction assembly, when in its said inoperative position, acts as a counterbalance for said dump body as said dump body moves from its said transport position to its said dumping position.

5. The combination of claim 1 wherein a plurality of side dump bodies are movably positioned on said frame means and wherein at least some of said dump bodies have a material compaction assembly positioned thereon.

6. The combination of claim 1 wherein said front wall, said back wall, and said first and second side walls are substantially vertically disposed.

7. The combination of claim 1 wherein said material compaction assembly is operatively pivotally mounted on said frame means.

8. The combination of claim 2 wherein said material compaction assembly is positioned at one side of said dump body when in its said inoperative position.

9. The combination of claim 8 wherein said material compaction assembly is substantially horizontally disposed when in its said operative position and is substantially vertically disposed when in its said inoperative position.

10. The combination of claim 9 wherein said dump body is pivotally moved towards said first side of said wheeled frame means when being moved to its said dumping position and wherein said material compaction assembly is moved towards said second side of said wheeled frame means when being moved from its said operative position to its said inoperative position.

11. The combination of claim 10 wherein said material compaction assembly is pivotally secured to said wheeled frame means and wherein a power cylinder means interconnects said material compaction assembly and said wheeled frame means for moving said material compaction assembly between its said operative and inoperative positions.

\* \* \* \* \*